(12) United States Patent
Chiasson et al.

(10) Patent No.: US 10,663,681 B2
(45) Date of Patent: May 26, 2020

(54) HINGED OPTICAL FIBER RIBBON MOVEABLE BETWEEN ALIGNED AND COLLAPSED POSITIONS

(71) Applicant: CORNING OPTICAL COMMUNICATIONS LLC, Hickory, NC (US)

(72) Inventors: David Wesley Chiasson, Edmonton (CA); Christopher Mark Quinn, Hickory, NC (US); Rebecca Elizabeth Sistare, Hickory, NC (US); Kenneth Darrell Temple, Jr., Newton, NC (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/279,522

(22) Filed: Feb. 19, 2019

(65) Prior Publication Data
US 2019/0179094 A1 Jun. 13, 2019

Related U.S. Application Data

(63) Continuation of application No. PCT/US2017/047924, filed on Aug. 22, 2017.

(60) Provisional application No. 62/377,882, filed on Aug. 22, 2016.

(51) Int. Cl.
*G02B 6/44* (2006.01)

(52) U.S. Cl.
CPC .......... *G02B 6/4404* (2013.01); *G02B 6/4411* (2013.01); *G02B 6/4471* (2013.01); *G02B 6/4478* (2013.01)

(58) Field of Classification Search
CPC ........................... G02B 6/4404; G02B 6/4411
See application file for complete search history.

(56) References Cited

U.S. PATENT DOCUMENTS

| | | | |
|---|---|---|---|
| 4,952,020 A | 8/1990 | Huber | |
| 4,991,930 A | 2/1991 | Baek et al. | |
| 5,166,998 A | 11/1992 | Patel | |
| 5,212,756 A | 5/1993 | Eoll | |
| 5,682,454 A | 10/1997 | Gaillard | |

(Continued)

FOREIGN PATENT DOCUMENTS

| | | |
|---|---|---|
| DE | 4319246 A1 | 12/1994 |
| DE | 4331361 A1 | 5/1995 |

(Continued)

OTHER PUBLICATIONS

International Search Report and Written Opinion of the International Searching Authority; PCT/US2017/047924 dated Dec. 26, 2017; ISA/US Commissioner for Patents.

(Continued)

*Primary Examiner* — Sung H Pak
(74) *Attorney, Agent, or Firm* — William D. Doyle

(57) ABSTRACT

An optical fiber ribbon and a related cable are provided. The ribbon includes a first group of at least one optical fiber and a second group of at least two optical fibers coupled together. The ribbon includes a first hinge coupling the first group to the second group. The hinge allows movement of the first group and the second group of optical fibers relative to each other such that the ribbon is moveable between an aligned position and a collapsed position. The number of optical fibers in the first group is less than the number of optical fibers in second group.

13 Claims, 4 Drawing Sheets

(56) References Cited

U.S. PATENT DOCUMENTS

| | | |
|---|---|---|
| 9,989,723 B2 | 6/2018 | Hoshino et al. |
| 2001/0007604 A1 | 7/2001 | Lail |
| 2001/0024554 A1 | 9/2001 | Lochkovie et al. |

FOREIGN PATENT DOCUMENTS

| | | |
|---|---|---|
| FR | 2752063 A1 | 2/1998 |
| GB | 2026718 A | 2/1980 |
| JP | 9080279 A | 3/1997 |
| JP | 2011221320 A | 11/2011 |
| JP | 20112201320 A | 11/2011 |
| JP | 2014016529 A | 1/2014 |
| JP | 2014016530 A | 1/2014 |
| JP | 05847008 B2 | 1/2016 |
| WO | 2011043324 A1 | 4/2011 |

OTHER PUBLICATIONS

European Patent Application No. 17844251.3; Extended Search Report dated Feb. 19, 2020; European Patent Office; 8 Pgs.

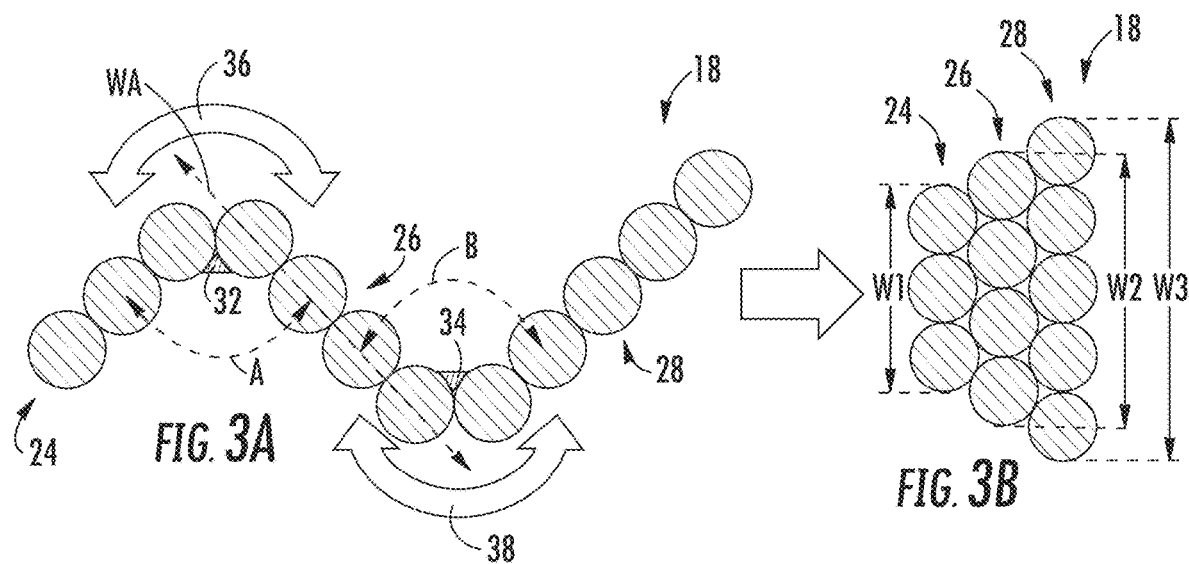
FIG. 3A
FIG. 3B
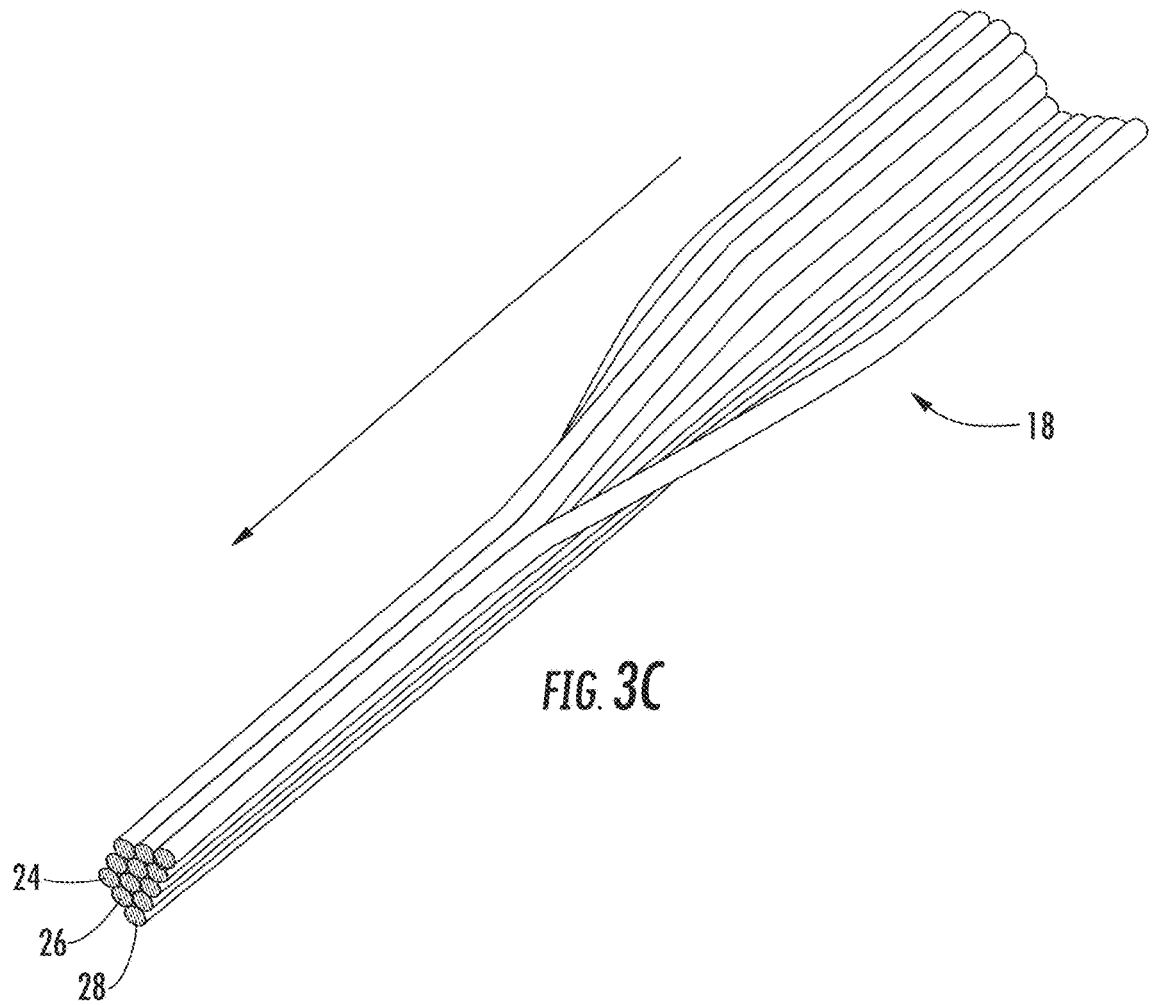
FIG. 3C

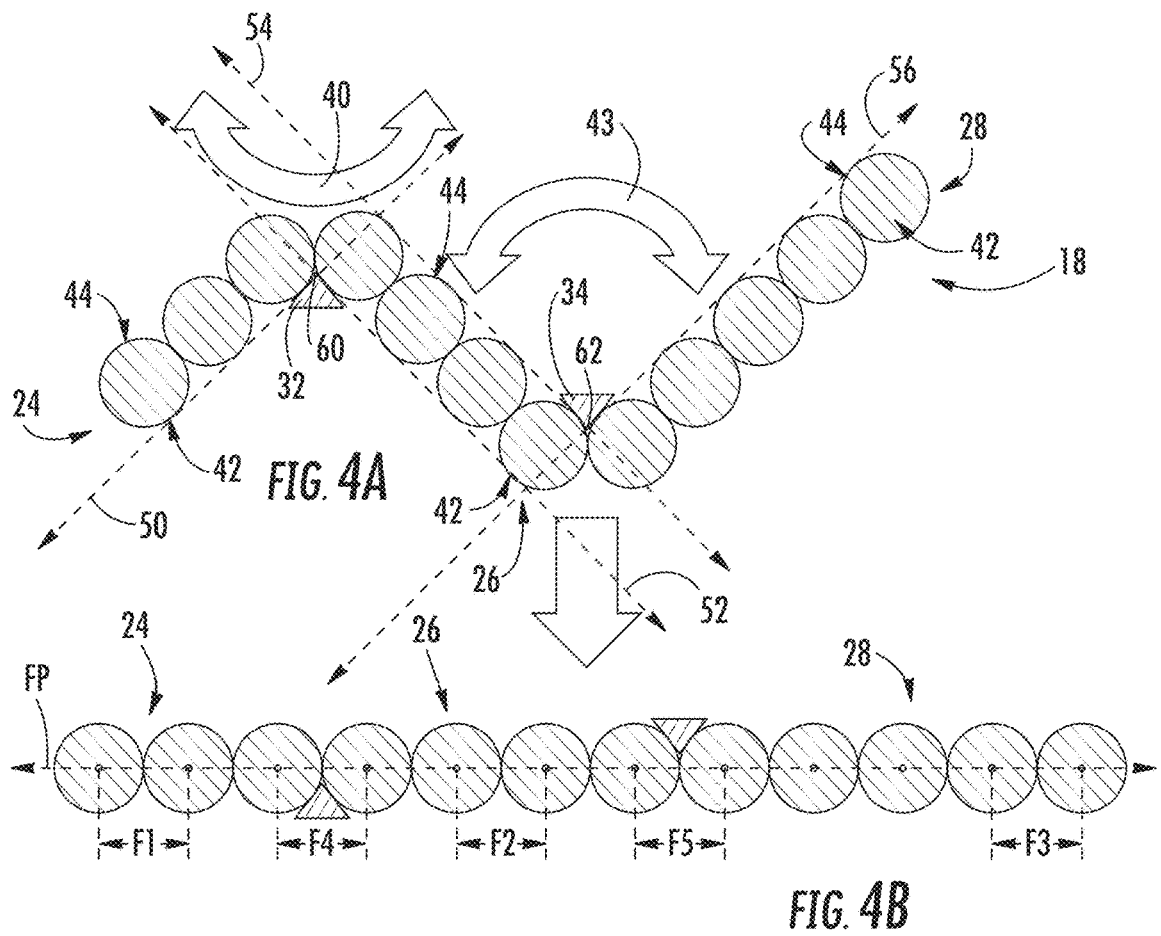
FIG. 4A
FIG. 4B
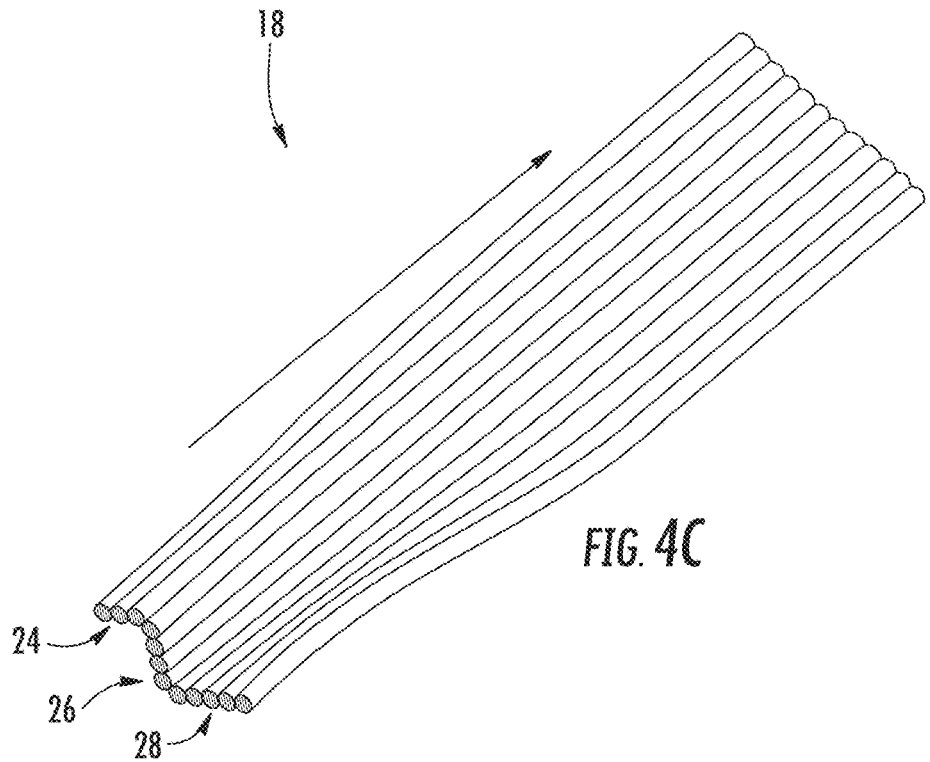
FIG. 4C

HINGED OPTICAL FIBER RIBBON MOVEABLE BETWEEN ALIGNED AND COLLAPSED POSITIONS

RELATED APPLICATIONS

This application is a continuation of International Application No. PCT/US17/47924, filed on Aug. 22, 2017, which claims the benefit of priority to U.S. Application No. 62/377,882, filed on Aug. 22, 2016, both applications being incorporated herein by reference.

BACKGROUND

The disclosure relates generally to optical fibers and more particularly to optical fiber ribbons. Optical fibers have seen increased use in a wide variety of electronics and telecommunications fields. Optical fiber ribbons may hold multiple optical fibers together in a group or array. The optical fiber ribbon includes a body formed from a material that holds the optical fibers together and/or that provides structure that assists in the handling and connecting of the optical fibers of the ribbon to various components or devices.

SUMMARY

One embodiment of the disclosure relates to an optical fiber ribbon. The ribbon includes a first group of at least one optical fiber and a second group of at least two optical fibers coupled together. The ribbon includes a first hinge coupling the first group to the second group. The number of optical fibers in the first group is less than the number of optical fibers in the second group.

An additional embodiment of the disclosure relates to an optical fiber ribbon. The ribbon includes a first row of optical fibers having an n number of optical fibers and each has a central longitudinal axis. The ribbon includes a second row of optical fibers having at least an n+1 number of optical fibers, and each has a central longitudinal axis. The ribbon includes a third row of optical fibers having at least an n+2 number of optical fibers, and each having a central longitudinal axis. The ribbon includes a first polymer joint coupling the first row to the second row and a second polymer joint coupling the second row to the third row. The first polymer joint moves such that the first and second rows rotate relative to the first polymer joint between a collapsed position and an aligned position. In the collapsed position the central longitudinal axis of each optical fiber of the first row defines a plane that is spaced from and substantially parallel to a plane defined by the central longitudinal axes of the optical fibers of the second row. In the aligned position the central longitudinal axes of the optical fibers of the first row are substantially coplanar with the central longitudinal axes of the optical fibers of the second row. The second polymer joint moves such that second and third rows rotate relative to the second polymer joint between a collapsed position and an aligned position. In the collapsed position the central longitudinal axis of each optical fiber of the second row defines a plane that is spaced from and substantially parallel to a plane defined by the central longitudinal axes of the optical fibers of the third row. In the aligned position the central longitudinal axes of the optical fibers of the second row are substantially coplanar with the central longitudinal axes of the optical fibers of the third row. N is at least 1.

An additional embodiment of the disclosure relates to an optical cable. The optical cable includes a cable jacket including an inner surface defining a central channel and a core structure located in the central channel. The optical cable includes a plurality of optical fiber units located in the central channel and surrounding the core structure. Each optical fiber unit includes a first row of optical fibers including an n number of optical fibers, a second row of optical fibers including at least an n+1 number of optical fibers, and a third row of optical fibers including at least an n+2 number of optical fibers. The first, second, and third rows are coupled together in an arrangement such that the first row of optical fibers is located between the core structure and the second row of optical fibers in the radial direction, the second row of optical fibers is located between the first row and the third row of optical fibers in the radial direction and the third row of optical fibers is located between the second row of optical fibers and the inner surface of the cable jacket. N is at least 1.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 3A-3C show movement of the optical fiber ribbon of FIG. 2 from an intermediate position to a collapsed position according to an exemplary embodiment.

FIGS. 4A-4C show movement of the optical fiber ribbon of FIG. 2 from an intermediate position to an aligned position according to an exemplary embodiment.

DETAILED DESCRIPTION

Referring generally to the figures, various embodiments of an optical ribbon and a related optical fiber cable are shown. In general, the ribbon embodiments disclosed herein include a plurality of optical fiber groups or rows that are joined together by a hinge or flexible joint. Within each group or row, the optical fibers are bound together in a relatively fixed position by a relatively rigid polymer, ribbon matrix material. The hinge is positioned and structured to allow the ribbon to move between an aligned position in which the optical fibers of all of the rows lie in substantially the same plane, and a collapsed position in which the rows are stacked on top of each other.

In various embodiments, when in the aligned position, the ribbon and the hinge structures are sized and configured such that the distance between optical fibers across the hinge is substantially the same as the distance between optical fibers within each row. The ability to move the ribbon to the aligned position while providing consistent fiber spacing across the hinge provides a collapsible ribbon that facilitates mass fusion splicing and fiber coating stripping. Further, the collapsed position allows the ribbon to assume a compact form and in specific embodiments, also allows the collapsed ribbon to be assembled into a densely packed cable arrangement with little or no preferential bend, which typically achieved previously with loose-tube type optical fiber cables. Thus, the ribbon arrangement discussed herein provides both the fiber organization and mass fusion splicing benefits typical of standard ribbon or ribbon stack cables and bend performance characteristics typical of loose tube cables.

Figure 1:
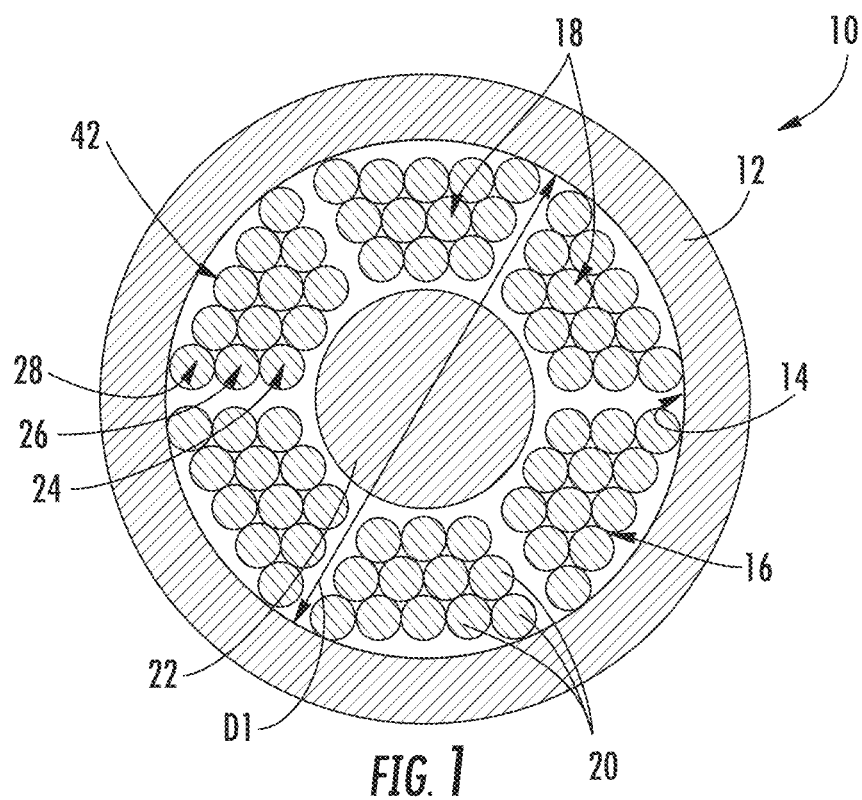
FIG. 1 shows a cross-sectional view of an optical fiber ribbon cable according to an exemplary embodiment.

Referring to FIG. 1, an optical communication cable, such as cable 10, is shown according to an exemplary embodiment. Cable 10 includes a cable jacket or layer, shown as outer cable jacket 12, having an inner surface 14 that defines an inner passage or cavity, shown as central bore 16. As will be generally understood, inner surface 14 of outer jacket 12 defines an internal area or region within which the various cable components discussed below are located.

As shown in FIG. 1, cable 10 includes a plurality of optical fiber units, shown as optical fiber ribbons 18. As will be explained in more detail below, optical fiber ribbons 18 are shown in a folded or collapsed position within cable jacket 12.

In general, each optical fiber ribbon 18 includes a plurality of individual elongate optical fibers, shown as optical fibers 20, that are coupled together, e.g., with a polymer ribbon matrix material. As will be discussed in more detail below and in contrast to some cable arrangements, such as loose-tube arrangements, optical fibers 20 of each ribbon 18 are fixed in position relative to at least some other fibers 20 of ribbon 18 via the ribbon matrix. In various embodiments, cable 10 can include any suitable number of optical fiber ribbons 18 and each optical fiber ribbon 18 can include any suitable number of optical fibers 20. In various embodiments, cable 10 includes 1 to 400 ribbons 18, and each ribbon 18 includes 3-40 individual optical fibers 20. In the specific embodiment shown, cable 10 includes 6 ribbons 18, each including 12 optical fibers 20. Table 1 shows the fiber count of different layers of ribbon 18, according to exemplary embodiments.

TABLE 1

| Layer 1 | Layer 2 | Layer 3 | Layer 4 | Total RibbonFiber Count |
|---|---|---|---|---|
| 3 | 4 | 5 |  | 12 |
| 3 | 4 | 5 | 6 | 18 |
| 5 | 6 | 7 |  | 18 |
| 5 | 6 | 7 | 8 | 26 |
| 6 | 7 | 8 | 9 | 30 |
| 7 | 8 | 9 |  | 24 |
| 7 | 8 | 9 | 10 | 34 |
| 2 | 3 | 4 | 5 | 14 |

Referring to FIG. 1, cable 10 includes a core structure, shown as central strength element 22, located within cable jacket 12. In various embodiments, central strength element 22 is an elongate tensile strength element, such as a glass-reinforced plastic rod (GRP), steel rod/wire, etc. In other embodiments, central strength element 22 is a bundle of tensile strength yarn, such as aramid yarn fibers. In other embodiments, the core structure of cable 10 may be other structures or cable components located within cable jacket 12. For example, in one embodiment, the core structure may include one or more additional layers of optical fiber ribbons 18 located toward the center of channel 16.

As shown, optical fiber ribbons 18 are in a folded or collapsed position and are arranged around and surrounding central strength element 22, such that optical fibers 20 of each ribbons 18 form multiple rows of optical fibers that are stacked in the radial direction relative to the central strength member 22. In this arrangement, each ribbon 18 includes an inner row 24, a middle row 26 and an outer row 28. Inner row 24 is located between central strength element 22 and middle row 26 in the radial direction. In addition, middle row 26 is located between inner row 24 and outer row 28 in the radial direction, and outer row 28 is located between middle row 26 and inner surface 14 of jacket 12 in the radial direction. In the embodiment shown in FIG. 1, inner row 24 includes an n number of optical fibers 20, middle row 26 includes at least n+1 number of optical fibers 20, and outer row 28 includes at least n+2 number of optical fibers 20. In specific embodiments, n is at least 1.

In the embodiment shown in FIG. 1, the number of optical fibers 20 in inner row 24 is less than the number of optical fibers 20 in middle row 26, and the number of optical fibers 20 in middle row 26 is less than the number of optical fibers 20 in outer row 28. Thus, in this arrangement, the number of optical fibers per row in the collapsed ribbon 18 is directly related to the distance of the row from the center point of bore 16 and from central strength element 22. As shown in FIG. 1, the increasing number of optical fibers per row in the radial direction results in wedge or trapezoidal shaped ribbons surrounding central strength member 22, which provides very little or no preferential bend to cable 10 as a whole. As will be understood, the typical ribbon-based fiber optic cable includes a rectangular stack of centrally located optical ribbons which exhibits different bend characteristics along different bend axes based on the orientation of the ribbon stack within the cable jacket. Further, as explained in more detail below, in embodiments of ribbons 18 in which the optical fiber rows are joined by hinges, ribbons 18 may be unfolded from the collapsed position shown in FIG. 1 to an aligned position to facilitate various cable operations, such as mass fusion splicing and/or fiber coating stripping.

In the specific embodiment shown, inner row 24 includes three optical fibers 20, middle row 26 includes four optical fibers 20, and outer row 28 includes five optical fibers 20. However, in other embodiments, ribbons 18 may have less than three rows or more than three rows, and the rows may have more or less optical fibers 20 than shown in FIG. 1. For example, in another specific embodiment, inner row 24 includes one optical fiber 20, middle row 26 includes two optical fibers 20, and outer row 28 includes three optical fibers 20. In another specific embodiment, ribbon 18 includes four rows such that inner row 24 includes three optical fiber 20, a first middle row 26 includes four optical fibers 20, a second middle row 26 includes five optical fibers 20 and outer row 28 includes eight optical fibers 20. In addition, while ribbon 18 includes hinges to move between aligned and collapsed positions as discussed in more detail below, in other embodiments, versions of ribbon 18 that are permanently formed within a ribbon matrix in a wedge shape as shown in FIG. 1 are contemplated.

By utilizing the ribbon arrangements discussed herein, it is believed that cable 10 provides a unique combination of dense fiber packing and small cable diameter (similar to that typically achieved with non-ribbon fiber arrangements such as loose tube arrangements), in combination with the organizational benefits of a ribbon cable. In various embodiments, cable 10 is a 72 fiber cable and has a core diameter, D1, between 2.5 mm and 3 mm, specifically between 2.8 mm and 2.9 mm and more specifically of about 2.85 mm (e.g., 2.85 mm plus or minus 1%). This is in contrast to one typical 72 fiber central tube, ribbon stack cable that has a core diameter of about 3.27 mm, not including cross-sectional area occupied by strength elements. In addition, the ribbon structure discussed herein allows for formation of a ribbon cable with a central strength element (e.g., a strength element located in the center of the cable jacket) as opposed to the strength element positions typical in ribbon cable designs.

Referring to FIGS. 2-6, the structure and operation of ribbon 18 is shown in more detail, according to an exemplary embodiment. The optical fibers 20 of each row 24, 26 and 28 are bound or coupled together with a polymer material or ribbon body, shown schematically as ribbon matrix 30. In specific embodiments, optical fibers 20 of each row are surrounded by and embedded in the material of ribbon matrix 30 of each row. In the embodiment shown, ribbon matrix 30 of each row holds the optical fibers 20 of each row in a substantially parallel array of optical fibers 20 in which the central longitudinal axes of each optical fiber 20 (the axis of each optical fiber 20 perpendicular to the lateral cross-section shown in FIG. 2) are substantially parallel or substantially planar with each other (e.g., offset from the normal plane of the central axes a distance less than or equal to 30 micron) to each other. Thus, ribbon matrix 30 is a relatively rigid material that is sufficiently rigid to maintain the optical fibers of rows 24, 26 and 28 in array arrangement shown in FIG. 2. Ribbon matrix 30 of each row may be any of a wide variety of ribbon matrix configurations, such as single material or multi-layered ribbon matrices.

Ribbon 18 includes a plurality of hinges or joints, shown as flexible hinges 32 and 34. Hinge 32 is located between and couples together inner row 24 and second row 26, and hinge 34 is located between and couples together second row 26 and third row 28. In general, hinges 32 and 34 are moveable or flexible coupling elements or joints that provide the movement that allows ribbon 18 to move between aligned and collapsed positions as discussed herein. In some embodiments, hinges 32 and 34 are contiguous flexible structures that extend the entire length of ribbon 18, and in other embodiments, hinges 32 and 34 are discontinuous flexible structures that are located at discrete positions along the length of ribbon 18.

Figure 2:
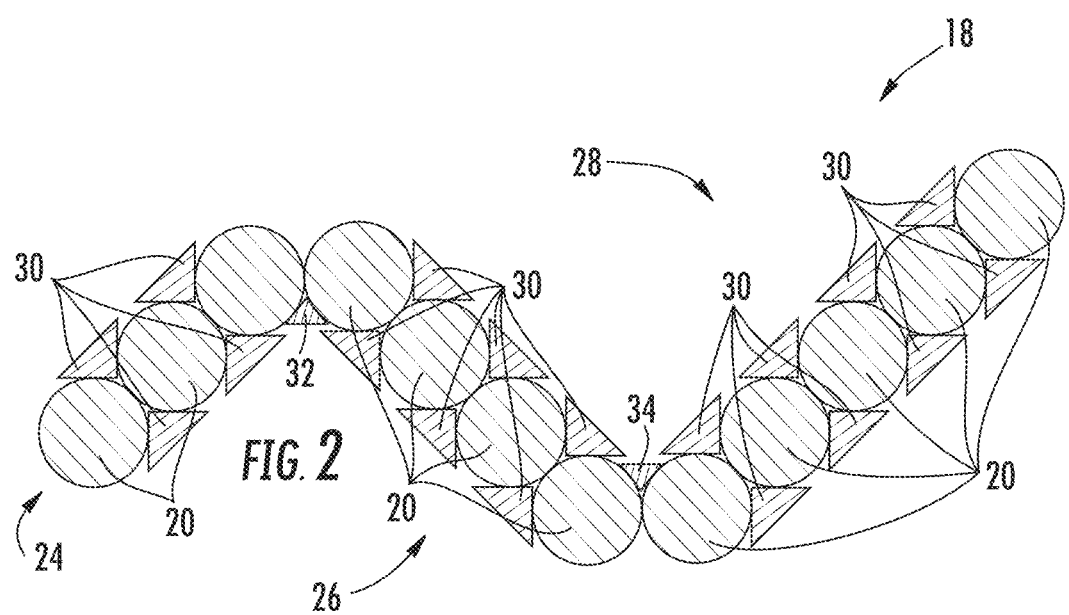
FIG. 2 shows an end cross-sectional view of an optical fiber ribbon according to an exemplary embodiment.

As shown in FIG. 2, ribbon 18 is in an intermediate position in which rows 24, 26 and 28 are positioned at angles relative to each other, and hinges 32 and 34 are located on opposite sides of ribbon 18 forming the N-shaped intermediate position. As shown in FIG. 3A, in specific embodiments, the angle A between the planes intersecting the central axes of optical fibers 20 of rows 24 and 26 is 70 degrees to 110 degrees, and the angle B between the planes intersecting the central axes of optical fibers 20 of rows 26 and 28 is 70 degrees to 110 degrees. This hinge positioning, at least in part, allows for ribbon 18 to be folded into a compact, collapsed position. In specific embodiments, the intermediate, N-shaped position shown in FIG. 2 is the neutral position provided by hinges 32 and 34 such that a force is applied to move ribbon 18 to either the aligned position or the collapsed position from the neutral, intermediate position.

The materials of ribbon matrix 30 and of hinges 32 and 34 are selected to have physical properties to provide the functions discussed herein. Specifically, ribbon matrix 30 is one or more polymer material that is relatively rigid such that the positioning and spacing of optical fibers 20 within each row is maintained. In addition, the material of ribbon matrix 30 is also sufficiently rigid to provide a degree of physical protection to optical fibers 20. In contrast, hinges 32 and 34 are formed from one or more relatively flexible polymer material which allows for flexing and bending to provide the hinge movement as discussed herein.

In various embodiments, the polymer material of ribbon matrix 30 has a Young's modulus of elasticity that is greater than the Young's modulus of elasticity of the materials of hinges 32 and 34. In specific embodiments, the Young's modulus of elasticity of the polymer material(s) of ribbon matrix 30 is between 100 MPa and 500 MPa, and the Young's modulus of elasticity of the polymer material(s) of hinges 32 and 34 is between 5 MPa and 100 MPa. In various embodiments, the ribbon matrix 30 and/or hinges 32 and 34 discussed herein may be formed by applying a polymer material, such as a UV curable polymer material, in contact with optical fibers 20 in the desired arrangement to form a particular ribbon matrix or hinge shape. The polymer material is then cured (e.g., through application of UV energy) forming the ribbon matrix or hinge while also coupling the UV curable material to the optical fiber. In other embodiments, the ribbon matrix or hinges discussed herein may be formed from any suitable polymer material, including thermoplastic materials and thermoset materials. In specific embodiments, the materials of ribbon matrix 30 and hinges 32 and 34 may have different colors from each other to aid in manufacturing and to facilitate location of hinges 32 and 34 and movement of ribbons 18 between intermediate, aligned and collapsed positions.

Referring to FIGS. 3A-3C, movement of ribbon 18 from the intermediate position to the collapsed position is shown. As shown in FIG. 3A, hinge 32 is configured to move inner row 24 and middle row 26 together via rotation in the direction shown by arrow 36, and hinge 34 is configured to move middle row 26 and outer row 28 together via rotation in the direction shown by arrow 38. To form the collapsed configuration shown in FIG. 3B, the rotational movement indicated by arrows 36 and 38 are opposite from each other. In addition, to provide the rotational movement shown in FIG. 3A, the pivot axes defined hinges 32 and 34 are located on opposite sides of a width axis of middle row 26, shown as WA in FIG. 3A. As shown in FIG. 3B, WA is the axis or plane that extends through the longitudinal center points of optical fibers 20 of middle row 26.

In the collapsed position of FIG. 3B, inner row 24 contacts middle row 26 on a first side, and a second side of middle row 26 contacts outer row 28. Specifically, in the orientation of FIG. 3A, a lower surface of inner row 24 is brought into contact with a lower surface of middle row 26, and an upper surface of middle row 26 is brought into contact with an upper surface of outer row 28. As will be understood, which row surfaces are in direct contact with each other in the collapsed position depends on how the optical fibers of each row are supported or bound together. In one embodiment, the surfaces of the rows contacting each other in the collapsed positions are the outer surfaces of the ribbon matrix 30 of each row, for example in a ribbon design where ribbon matrix 30 completely or partially surrounds optical fibers 20. In other embodiments, the surfaces of the rows contacting each other in the collapsed positions are the outer surfaces of optical fibers 20 (e.g., outer fiber coating layers, outer UV curable ink layers, etc.) wherein ribbon matrix 30 is in the form of adhesive or polymer bridges located between optical fibers but not surrounding the optical fibers.

Referring to FIG. 3B, the wedge shape of the collapsed position of ribbon 18 is shown in detail. As shown in FIG. 3B, inner row 24 has a width, W1, middle row 26 has a width, W2 and outer row 28 has a width W3. In general, due to the fiber number differential between rows 24, 26 and 28, W1 is less than W2, and W2 is less than W3. In specific embodiments, where there is one fiber diameter difference between each row, W1 is between 150 µm and 300 µm less than W2, and W2 is between 150 µm and 300 µm less than W3. In specific embodiments, the diameter of each optical fiber 20 is about 250 µm, and in the 12 fiber ribbon embodiment shown, W1 is about 750 µm, W2 is about 1000 µm and W3 is about 1250 µm.

Referring to FIG. 3C, a perspective view of ribbon 18 transitioning from the intermediate position shown in FIG. 2 to the collapsed position shown in FIG. 3B is shown. In a specific embodiment, ribbon 18 is formed in the intermediate position, and ribbon 18 is folded into the collapsed position during cable assembly. In a specific embodiment, ribbon 18 is collapsed during cable assembly as the ribbon is assembled around a central strength member (or other core structure), and a binding structure, such as a helically wrapped binder or constrictive thin-film binder is applied to hold ribbons 18 in the collapsed configuration around the central strength member. In various embodiments, reach ribbon 18 is stranded (e.g., in a SZ stranding pattern, a helical stranding pattern, an alternating helical stranding pattern, etc.) around the central strength member.

FIGS. 4A-4C show movement of ribbon 18 from the intermediate position to the aligned position shown in FIGS. 4B and 4C. As shown in FIG. 4A, hinge 32 is configured to move inner row 24 and middle row 26 away from each other via rotation in the direction shown by arrow 40, and hinge 34 is configured to move middle row 26 and outer row 28 away from each other via rotation in the direction shown by arrow 43. To form the aligned configuration shown in FIG. 4B, the rotational movement indicated by arrows 40 and 43 are opposite from each other, and rotation as shown by arrows 40 and 43 brings ribbon 18 into the aligned position shown in FIG. 4B. In the aligned position of FIG. 4B, the central longitudinal axes of optical fibers 20 of rows 24, 26 and 28 are substantially coplanar with each other, such that the maximum perpendicular distance between any of the optical fibers 20 and the aligned position central fiber plane, FP, is less than or equal to 30 µm.

As noted above, ribbon 18 and hinges 32 and 34 are positioned and configured to provide consistent inter-fiber spacing across the entire width of ribbon 18 that facilitates mass fusion splicing. In particular, as shown in FIG. 4B, the distance between central longitudinal axes of optical fibers 20 within inner row 24 is shown as F1, and the distance between central longitudinal axes of optical fibers 20 within middle row 26 is shown as F2, and the distance between central longitudinal axes of optical fibers 20 within outer row 28 is shown as F3. In addition, the spacing between the hinge-adjacent optical fibers 20 of rows 24 and 26 is shown as F4, and, the spacing between the hinge-adjacent optical fibers 20 of rows 26 and 28 is shown as F5.

As shown in FIG. 4B, hinges 32 and 34 are configured such that the inter-row fiber spacing shown as F4 and F5 is substantially the same (e.g., within 5% of each other) as the intra-row fiber spacing shown as F1, F2 and/or F3. In contrast to some flexible or bendable ribbon designs that have increased fiber spacing spanning a flexible structure, ribbon 18 and hinges 32 and 34 provide consistent spacing between all fibers within ribbon 18, and this consistent fiber spacing facilitates splicing, and in particular mass fusion splicing.

The consistent spacing between optical fibers 20 across ribbon 18 is provided by a hinge positioning and arrangement that allows the optical fibers on either side of the hinge to move close together when ribbon 18 is in the aligned position. Referring to FIG. 4A, rows 24, 26 and 28 each have upper and lower surfaces 42 and 44, respectively. As shown in FIG. 4A, inner row 24 defines a first plane 50 that is tangential to the lower surface 42 of inner row 24, and middle row defines a second plane 52 that is tangential to the lower surface 42 of middle row 26. Further, middle row 26 defines a third plane 54 that is tangential to the upper surface 42 of middle row 26, and outer row 28 defines a fourth plane 56 that is tangential to the upper surface of outer row 28.

Specifically, the fiber spacing provided in the aligned position is provided by a hinge 32 that is positioned such that a pivot axis 60 of hinge 32 is intersected by planes 50 and 52 and by a hinge 34 that is positioned such that a pivot axis 62 of hinge 34 is intersected by planes 54 and 56. In addition, in this arrangement, pivot axis 60 of hinge 32 is located on one side of middle row 26 and also on one side of fiber plane, FP, and pivot axis 62 of hinge 34 is located on the other opposite side of middle row 26 and of fiber plane, FP.

Referring to FIG. 4C, a perspective view of ribbon 18 transitioning from the intermediate position to the aligned position of FIG. 4B is shown. In general, when a user desires to connect or splice ribbon 18, cable jacket 12 is opened, and one or more ribbons 18 are accessed. The accessed ribbon 18 is moved from the collapsed position through the intermediate position to the aligned position shown in FIG. 4B via the action of hinges 32 and 34 discussed herein. Once in the aligned position, ribbon 18 provides the organizational alignment of a standard linear array ribbon and allows easy and convenient splicing. In addition, the aligned position shown in FIG. 4B is also believed to provide convenient ribbon storage by allowing ribbon 18 to be placed into the aligned position and then wound onto a spool or reel.

Figure 5:
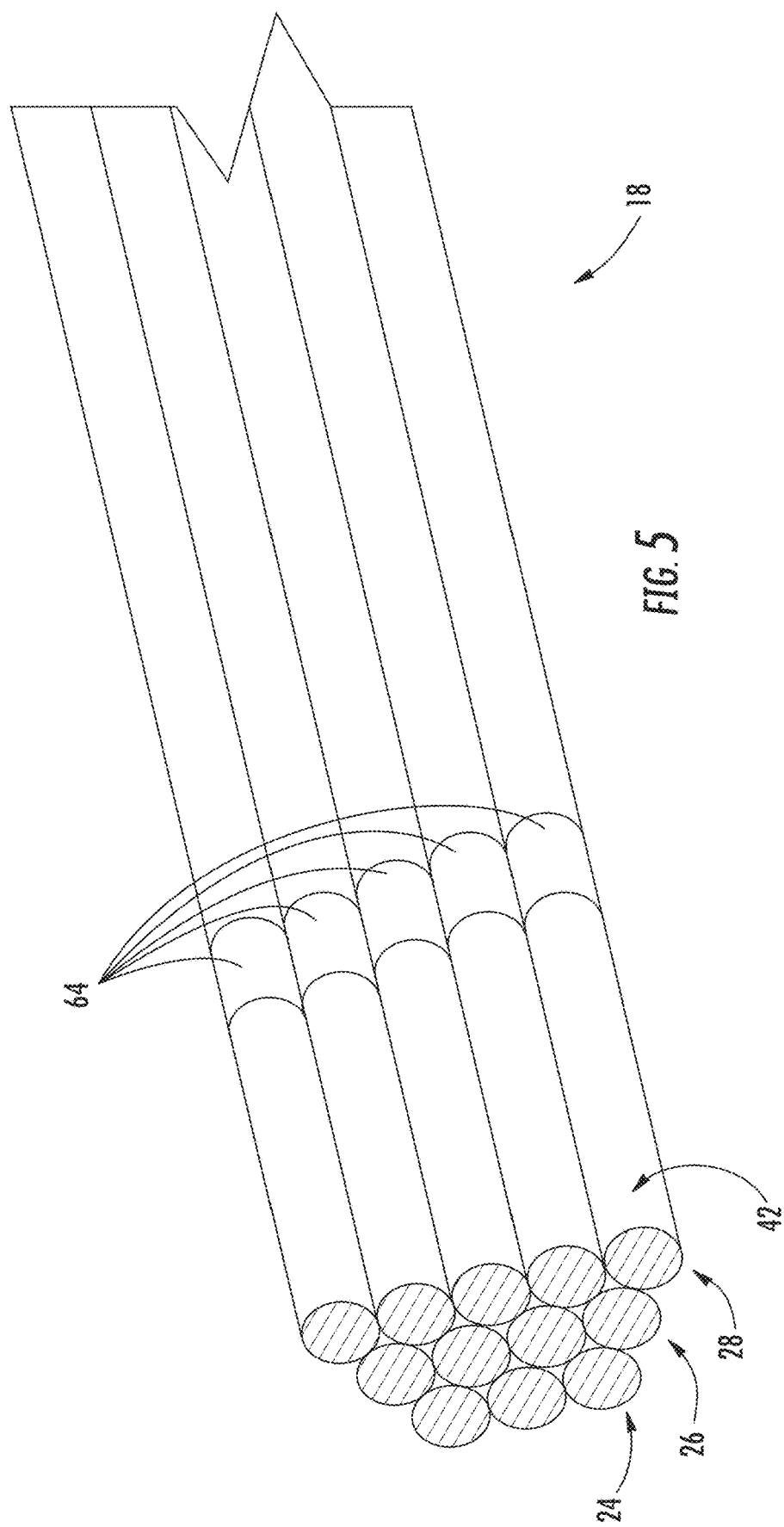
FIG. 5 shows a perspective view of the optical fiber ribbon of FIG. 2 in the collapsed position and including indicia according to an exemplary embodiment.

Referring to FIG. 5, in addition to providing the dense packing, bending and organizational improvements discussed above, ribbon 18 also provides for high visibility marking of ribbon 18 which aids the user in identifying a desired ribbon 18 within cable 10 during use, installation or splicing. As shown in FIG. 5, in the collapsed position, lower surface 42 of outer row 28 provides a relatively large and easy to view surface for receiving indicia 64. Indicia 64 may be any identifying indicia, such as ink jet applied alphanumeric numeric indicia or sections or stripes of various colors. In some embodiments, indicia 64 includes a marking, color or other information that identifies a particular ribbon position within cable 10 and also includes varying markings, colors or other information that identifies a particular optical fiber 20 within ribbon 18. As shown in FIG. 1, lower surface 42 of outer row 28 faces radially outward when in the collapsed position within cable 10, and thus, by positioning indicia 64 on surface 42 of outer row 28, indicia 64 is viewable to the user upon opening of cable jacket 12.

It should be understood that the optical ribbons discussed herein can include various numbers of optical fibers 20. In various exemplary embodiments, the optical ribbons discussed herein may include 2, 4, 6, 8, 10, 12, 14, 16, 18, 24, etc. optical fibers 20. While the ribbon embodiments discussed herein are shown having optical fibers 20 rows arranged in a substantially parallel, linear array, optical fibers 20 may be arranged in a square array, rectangular array, a staggered array, or any other spatial pattern that may be desirable for a particular application in combination with the various hinge arrangements discussed herein. In various embodiments, optical fibers 20 can include a wide variety of optical fibers including multi-mode fibers, single mode fibers, bend insensitive/resistant fibers, etc. In other embodiments, the optical ribbons discussed herein may include multi-core optical fibers.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon comprising:
a first group of at least one optical fiber;
a second group of at least two optical fibers coupled together;
a first hinge coupling the first group to the second group, wherein the number of optical fibers in the first group is less than the number of optical fibers in the second group;
a third group of at least three optical fibers coupled together; and
a second hinge coupling the second group to the third group, wherein the number of optical fibers in the second group is less than the number of optical fibers in the third group, and wherein the first hinge defines a first pivot axis, the second hinge defines a second pivot axis, and the second group of optical fibers defines a width axis extending through central, longitudinal axes of the optical fibers of the second group, wherein, when viewed in cross-section taken perpendicular to longitudinal axes of the optical fibers, the first pivot axis and the second pivot axis are located on opposite sides of the width axis.

2. The optical fiber ribbon of claim 1, wherein the number of optical fibers in the first group is at least 2, the number of optical fibers in the second group is at least 3, and the number of optical fibers in the third group is at least 4.

3. The optical fiber ribbon of claim 1, wherein the first hinge is configured to move the first group into contact with the second group via rotation in a first direction, wherein the second hinge is configured to move the second group into contact with the third group via rotation in a second direction opposite of first direction such that the first, second and third groups of optical fibers assume a stacked arrangement that has a width through the first group that is less than a width through the third group.

4. The optical fiber ribbon of claim 1,
wherein the first, second and third groups each have a lower surface and an upper surface opposite of the lower surface;
wherein the first hinge is coupled between the first and second groups such that a first plane that is tangential to the lower surface of the first group and a second plane that is tangential to the lower surface of the second group passes through the first pivot axis;
wherein the second hinge is coupled between the second and third groups such that a third plane that is tangential to the upper surface of the second group and a fourth plane that is tangential to the upper surface of the third group passes through the second pivot axis.

5. The optical fiber ribbon of claim 4, further comprising identification means applied onto the lower surface of the third group.

6. The optical fiber ribbon of claim 1, wherein each optical fiber of the first, second and third groups has a central, longitudinal axis, wherein a first spacing distance is the perpendicular distance measured between the central longitudinal axes of adjacent optical fibers within the second group and a second spacing distance is the perpendicular distance between the central, longitudinal axes of end optical fibers of the second and third groups that are coupled together by the second hinge, wherein the difference between the first spacing distance and the second spacing distance is less than 5%.

7. The optical fiber ribbon of claim 1, wherein the optical fibers within each group are bound together by a first polymer material, and the first hinge and the second hinge are formed from a second polymer material, wherein the first polymer material has a higher Young's modulus of elasticity than the Young's modulus of elasticity of the second polymer material.

8. The optical fiber ribbon of claim 1, wherein the Young's modulus of elasticity of the first polymer material is between 100 MPa and 500 MPa, wherein the Young's modulus of elasticity of the second polymer material is between 5 MPa and 100 MPa.

9. An optical fiber ribbon comprising:
a first row of optical fibers including an n number of optical fibers, each having a central longitudinal axis;
a second row of optical fibers including at least an n+1 number of optical fibers, each having a central longitudinal axis;
a third row of optical fibers including at least an n+2 number of optical fibers, each having a central longitudinal axis;
a first polymer joint coupling the first row to the second row; and a second polymer joint coupling the second row to the third row;

wherein the first polymer joint moves such that the first and second rows rotate relative to the first polymer joint between a collapsed position and an aligned position, in the collapsed position the central longitudinal axis of each optical fiber of the first row defines a plane that is spaced from and substantially parallel to a plane defined by the central longitudinal axes of the optical fibers of the second row, and in the aligned position the central longitudinal axes of the optical fibers of the first row are substantially coplanar with the central longitudinal axes of the optical fibers of the second row; and wherein the second polymer joint moves such that second and third rows rotate relative to the second polymer joint between a collapsed position and an aligned position, in the collapsed position the central longitudinal axis of each optical fiber of the second row defines a plane that is spaced from and substantially parallel to a plane defined by the central longitudinal axes of the optical fibers of the third row, and in the aligned position the central longitudinal axes of the optical fibers of the second row are substantially coplanar with the central longitudinal axes of the optical fibers of the third row;

wherein n is at least 1; and wherein a first spacing distance is the distance measured between the central longitudinal axes of adjacent optical fibers within the second row and a second spacing distance is the distance between the central longitudinal axes of end optical fibers of the second and third rows that are located on opposite sides of the second polymer joint, wherein the difference between the first spacing distance and the second spacing distance is less than 5%.

10. The optical fiber ribbon of claim 9, wherein the number of optical fibers in the first row is at least 2, the number of optical fibers in the second row is at least 3, and the number of optical fibers in the third row is at least 4, and wherein the number of optical fibers in the second row is less than the number of optical fibers in the third row.

11. The optical fiber ribbon of claim 9, wherein the first polymer joint defines a first pivot axis and the second polymer joint defines a second pivot axis;

wherein the optical fibers of the first, second and third rows each have a lower surface and an upper surface opposite the lower surfaces;

wherein the first polymer joint moves such that, in the aligned position, a first plane that is tangential to the lower surfaces of the optical fibers of the first row and a second plane that is tangential to the lower surfaces of the optical fibers of the second row pass through the first pivot axis;

wherein the second polymer joint moves such that, in the aligned position, a third plane that is tangential to the upper surfaces of the optical fibers of the second row and a fourth plane that is tangential to the upper surfaces of the optical fibers of the third row pass through the second pivot axis.

12. The optical fiber ribbon of claim 9, wherein the first polymer joint defines a first pivot axis and the second polymer joint defines a second pivot axis, wherein, when viewed in cross-section taken perpendicular to central longitudinal axes of the optical fibers of the second row, the first pivot axis and the second pivot axis are located on opposite sides of the second row.

13. The optical fiber ribbon of claim 9, wherein the optical fibers within each row are supported by a first polymer material, and the first polymer joint and the second polymer joint are formed from a second polymer material, wherein the Young's modulus of elasticity of the first polymer material is between 100 MPa and 500 MPa, wherein the Young's modulus of elasticity of the second polymer material is between 5 MPa and 100 MPa.

* * * * *